United States Patent
Van Casteren et al.

(10) Patent No.: US 9,631,116 B2
(45) Date of Patent: Apr. 25, 2017

(54) RADIATION CURABLE AQUEOUS COMPOSITION FOR LOW GLOSS COATINGS

(71) Applicant: DSM IP ASSETS B.V., Heerlen (NL)

(72) Inventors: Ilse Van Casteren, Waalwijk (NL); Roland Tennebroek, Waalwijk (NL); Mario Cornelis Schoondermark, Waalwijk (NL); Paul De Kok, Waalwijk (NL)

(73) Assignee: DSM IP ASSETS B.V., Heerlen (NL)

( * ) Notice: Subject to any disclaimer, the term of this patent is extended or adjusted under 35 U.S.C. 154(b) by 0 days.

(21) Appl. No.: 14/139,694

(22) Filed: Dec. 23, 2013

(65) Prior Publication Data

US 2014/0114010 A1   Apr. 24, 2014

Related U.S. Application Data

(63) Continuation of application No. 13/789,293, filed on Mar. 7, 2013, now abandoned, which is a continuation of application No. 13/540,655, filed on Jul. 3, 2012, now abandoned, which is a continuation of application No. 12/527,494, filed as application No. PCT/EP2008/001272 on Feb. 19, 2008, now abandoned.

(30) Foreign Application Priority Data

Feb. 22, 2007  (EP) ..................................... 07003670

(51) Int. Cl.
| | | |
|---|---|---|
| C08L 75/16 | (2006.01) | |
| C08G 18/67 | (2006.01) | |
| C09D 175/16 | (2006.01) | |
| C09D 175/08 | (2006.01) | |
| C08G 18/08 | (2006.01) | |
| C09D 175/04 | (2006.01) | |
| C08L 75/04 | (2006.01) | |

(52) U.S. Cl.
CPC ....... *C09D 175/08* (2013.01); *C08G 18/0823* (2013.01); *C08G 18/672* (2013.01); *C09D 175/04* (2013.01); *C09D 175/16* (2013.01); *C08L 75/04* (2013.01); *C08L 75/16* (2013.01)

(58) Field of Classification Search
CPC  C08G 18/0823; C08G 18/672; C09D 175/16; C08L 75/04; C08L 75/16
USPC .................................... 522/85; 524/457, 839
See application file for complete search history.

(56) References Cited

U.S. PATENT DOCUMENTS

| | | | |
|---|---|---|---|
| 5,352,521 A | 10/1994 | Hotta et al. | |
| 5,422,186 A | 6/1995 | Biggeleben et al. | |
| 6,444,721 B2 | 9/2002 | Schwalm et al. | |
| 6,987,135 B2 | 1/2006 | Van Den Berg et al. | |
| 7,439,299 B2 | 10/2008 | Coogan et al. | |
| 7,976,953 B2 | 7/2011 | Van Casteren et al. | |
| 2002/0156145 A1 | 10/2002 | Van Den Berg et al. | |
| 2006/0111538 A1 | 5/2006 | Coogan et al. | |
| 2009/0012226 A1 | 1/2009 | Coogan et al. | |

OTHER PUBLICATIONS

International Search Report for PCT/EP2008/001272, mailed Jun. 11, 2008.
Written Opinion of the International Searching Authority for PCT/EP2008/001272, mailed Jun. 11, 2008.
Van den Berg et al, "Development of waterborne UV-A curable clear coat for car refinishes", Progress in Organic Coatings 61 (2008) 110-118.
Egbewatt et al, J.Chem.Pharm.Res., 2014 6(11):138-147.
van Benthem et al; Handbook of Polymer Reaction Engineering, Thermosets, Ch. 16, pp. 833-896 (2005).

*Primary Examiner* — Sanza McClendon
(74) *Attorney, Agent, or Firm* — Nixon & Vanderhye P.C.

(57) ABSTRACT

A radiation curable aqueous coating composition having a 85° gloss of ≤60 upon drying comprising (A) 10 to 99 wt % of a polyurethane, (B) 1 to 90 wt % of a radiation curable component; (C) 0.1 to 10 wt % of an associative thickener; wherein at least 80 wt % of (A)+(B)+(C) has a particle size greater than 500 nm and wherein the C═C bond concentration of the composition is 0.2 to 5.0 mmol per g of (A)+(B)+(C).

16 Claims, No Drawings

RADIATION CURABLE AQUEOUS COMPOSITION FOR LOW GLOSS COATINGS

This application is a continuation of U.S. patent application Ser. No. 13/789,293, filed Mar. 7, 2013 (now abandoned), which is a continuation of Ser. No. 13/540,655, filed Jul. 3, 2012 (now abandoned), which is a continuation of Ser. No. 12/527,494, filed Feb. 19, 2010 (now abandoned) which is the national phase application of international application no. PCT/EP2008/001272, filed Feb. 19, 2008 which designated the U.S. and claims priority to EP Application No. 07003670.2 filed Feb. 22, 2007, the entire contents of each of which are hereby incorporated by reference.

The present invention relates to an aqueous radiation curable coating composition having a 85° gloss of ≤60 upon drying, a process for preparing such a composition and a coating obtained from such a composition.

Coating compositions have long been used to produce coatings having desired coating characteristics. For example coating compositions are used to protect surfaces from the environment, to conceal surface irregularities, to provide a surface which is more receptive to further treatment, or to enhance the surface appearance, such as providing high gloss or low gloss.

Gloss is associated with the capacity of a surface to reflect more light in some directions than in others. High gloss surfaces reflect a high proportion of light directed at them and low gloss surfaces reflect a low proportion of light directed at them. The directions associated with mirror (or specular) reflection normally have the highest reflectances. Measurements by such a test method (as described for example in ASTM D 523-89) correlate with visual observations of surface shininess made at roughly the corresponding angles. Low gloss coatings that produce less image impairment are often more pleasing aesthetically.

Traditionally low gloss coating compositions are obtained by the addition of flattening agents such as silicone dioxide. Flattening agents are well known in the art and traditionally comprise materials ground into minute particles of irregular shape which are used in compositions such as paints and varnishes to disperse incident light rays so that a low gloss effect is achieved. Standard flattening agents include but are not limited to silica (for example amorphous silicon dioxide), diatomaceous earth, heavy metal soaps, talcum and chalk. To obtain for example low gloss in clear coats, typically more than 6 wt % of flattening agent based on the weight of the coating composition has to be added. Such compositions are disclosed in for example U.S. Pat. No. 6,284,836 B1 and EP 1,186,641 A1.

The disadvantages resulting from the addition of flattening agents to reduce gloss include coagulation of the composition resulting in a seedy appearance; increased brittleness of the resultant coating; settling out of the flattening agents often resulting in inconsistent mixing before application resulting in variation in gloss throughout the coating; and a decrease in burnish resistance as well as reducing the general resistance and performance properties of the coating. Burnish is the change in appearance of a coating as a result of rubbing the coating with a different material. The change in appearance may be measured as a change in the gloss level of a coating.

Low gloss coating compositions have been described in for example U.S. Pat. No. 6,331,582 B1 which discloses a thermally activated coating composition comprising an acrylic or polyester solvent based binder resin, colorant and a polyvinyl acetal matting agent. EP 0,841,992 A2 discloses a low gloss coating composition comprising acrylic polymer particles containing at least one void and pigments. U.S. Pat. No. 6,410,147 discloses a low gloss solvent based crosslinkable coating composition comprising a combination of a polar polymer, a non-polar polymer and a crosslinking agent. U.S. Pat. No. 5,744,522 discloses a low gloss coating powder composition comprising an acrylic copolymer, an aromatic polyester and a specific isocyanurate curing agent.

These all describe ways of avoiding the use of silicone dioxide flattening agents, however they appear to be providing complex and costly solutions, including a preference for the use of solvents and powders.

WO 04/60949 describes a low-gloss composition comprising a polyurethane crosslinkable by for example autoxidation, Schiff base crosslinking and silane condensation. Such compositions result in a quick molecular weight build up and possibly a higher crosslink density. By crosslinking by autoxidation is meant that crosslinking results from an oxidation occurring in the presence of air. By contrast by radiation curable is meant that radiation is required to initiate crosslinking. For example in UV-curing a photo initiator and UV-radiation is required, where the photoinitiator must absorb UV-radiation to undergo a chemical reaction to produce by products which will then initiate the crosslinking. Furthermore for UV-curing the presence of air is detrimental.

Lockhart (International Waterborne, High-Solids and Powder Coatings Symposium, Feb. 18-20, 2004) discloses general UV curable waterborne polyurethane dispersions.

The aqueous coating composition of the present invention provides a low gloss coating with good chemical resistances preferably without the use of flattening agents, which may be cured on demand by exposure to radiation. Furthermore the coating obtained from the aqueous coating composition of the present invention has a warmer look when compared with a conventional urethane coating using flattening agents. The look is very subjective and there do not appear to be any specific instrumental measurements available, however warmth may be measurable by colour tones, a cooler look may appear bluer while a warmer look may appear more white.

According to the present invention there is provided a radiation curable aqueous coating composition having a 85° gloss of ≤60 upon curing comprising:
(A) 10 to 99 wt % of a polyurethane obtained by the reaction of components comprising:
  (i) 5 to 65 wt % of at least one organic polyisocyanate;
  (ii) 0.1 to 6 wt % of at least one isocyanate-reactive component containing ionic or potentially ionic water-dispersing groups having a molecular weight in the range of from 100 up to 500 g/mol;
  (iii) 0 to 30 wt % of at least one isocyanate-reactive component containing water-dispersing groups and having a molecular weight in the range of from 500 to 6000 g/mol;
  (iv) 0 to 80 wt % of at least one isocyanate-reactive component containing radiation curable functional groups and having a molecular weight in the range of from 70 to 6000 g/mol;
  (v) 0 to 50 wt % of at least one component not comprised by (i), (ii), (iii), (iv) or (vi);
  (vi) 0 to 50 wt % of at least one active-hydrogen chain extending compound;
where (i), (ii), (iii), (iv), (v) and (vi) add up to 100 wt %; and where the NCO:OH ratio is in the range of from 0.4:1.0 to 10.0:1.0;

(B) 1 to 90 wt % of a radiation curable component;
(C) 0.1 to 10 wt % of an associative thickener;
wherein (A)+(B)+(C) add up to 100 wt %;
wherein at least 80 wt % of (A)+(B)+(C) has a particle size greater than 500 nm; and
wherein the C=C bond concentration of the composition is 0.2 to 5.0 mmol per g of (A)+(B)+(C).

Preferably the C=C bond concentration of the composition is in the range of from 0.25 to 3 mmol per g, more preferably 0.30 to 3 mmol per g, most preferably 0.35 to 2 mnol per g and especially 0.4 to 1.5 mmol per g of (A)+(B)+(C).

Gloss measurements are made with 60°, 20° or 85° geometry of angles and apertures. The 85° geometry is advantageous for comparing samples having 60° gloss values lower than 10. The 60° geometry is used for comparing most samples and for determining when the 20° geometry may be more applicable. The 20° geometry is advantageous for comparing samples having a 60° gloss value higher than 70.

Preferably the 85° gloss of the aqueous coating composition of the invention upon curing is ≤50, more preferably ≤40, more preferably ≤30, especially ≤20 and most especially ≤10.

Preferably the 60° gloss of the aqueous coating composition of the invention upon curing is ≤40, more preferably ≤20, most preferably ≤10, especially ≤5 and most especially ≤3.

Preferably at least 85 wt % and more preferably at least 90 wt % of (A)+(B)+(C) has a particle size greater than 500 nm, more preferably greater than 550 nm, most preferably greater than 600 nm and especially greater than 800 nm.

Preferably at least 85 wt % and more preferably at least 90 wt % of (A)+(B)+(C) has a particle size of less than 25000 nm, more preferably less than 20000 nm, most preferably less than 15000 nm and especially less than 10000 nm. The mean particle size (D[0.1]) of (A)+(B)+(C) is preferably greater than 500 nm, more preferably greater than 800 nm and especially greater than 1000 nm.

The mean particle size (D[0.1]) of (A)+(B)+(C) is preferably less than 9000 nm, more preferably less than 4000 nm and especially less than 1900 nm.

The mean particle size (D[0.5]) of (A)+(B)+(C) is preferably less than 10000 nm, more preferably less than 6000 nm and especially less than 4000 nm. D[0.5] is the maximum value in the Gaussian particle size distribution.

The mean particle size (D[0.5]) of (A)+(B)+(C) is preferably greater than 500 nm, more preferably greater than 800 nm and especially greater than 1500 nm.

By the particle size of a polymer particle is meant the diameter of that particle since the particles of the invention polymer are usually essentially spherical and for practical purposes are considered as preferably being spherical).

Not wishing to be bound to this theory, it appears however that the larger the particle size, the greater the gloss reduction when compared with a conventional particle size of around 40 to 150 nm. However an increase in particle size may also result in a decrease in stability of the polyurethane when in a dispersed state.

The polyurethane (A) preferably has a measured weight average molecular weight (Mw) in the range from 4,000 to 40,000 g/mol, more preferably in the range from 5,000 to 25,000 g/mol. The molecular weight may be measured by Gel Permeation Chromatography (GPC) using tetrahydrofuran as a solvent and polystyrene standards.

Methods for preparing polyurethanes are known in the art and are described in for example the Polyurethane Handbook $2^{nd}$ Edition, a Carl Hanser publication, 1994, by G. Oertel. The polyurethane (A) may be prepared in a conventional manner by reacting at least one organic polyisocyanate with at least one isocyanate-reactive component by methods well known in the prior art. Isocyanate-reactive groups include —OH, —SH, —NH—, and —NH$_2$. Usually an isocyanate-terminated polyurethane prepolymer is first formed which is then chain extended with an active hydrogen containing compound although a polyurethane may also be prepared without a chainextension step.

Component (i) comprises any suitable organic polyisocyanates including aliphatic, cycloaliphatic, araliphatic and/or aromatic polyisocyanates. Examples of suitable polyisocyanates include ethylene diisocyanate, 1,6-hexamethylene diisocyanate (HDI), isophorone diisocyanate (IPDI), cyclohexane-1,4-diisocyanate, 4,4'-dicyclohexylmethane diisocyanate (4,4'-H$_{12}$ MDI), p-xylylene diisocyanate, p-tetramethylxylene diisocyanate (p-TMXDI) (and its meta isomer m-TMXDI), 1,4-phenylene diisocyanate, hydrogenated 2,4-toluene diisocyanate, hydrogenated 2,6-toluene diisocyanate, 4,4'-diphenylmethane diisocyanate (4,4'-MDI), polymethylene polyphenyl polyisocyanates, 2,4'-diphenylmethane diisocyanate, 3(4)-isocyanatomethyl-1-methyl cyclohexyl isocyanate (IMCI) and 1,5-naphthylene diisocyanate. Preferred organic polyisocyanates are IPDI and/or H$_{12}$MDI which provide improved low yellowing and ease of processing of the self-crosslinkable polyurethane. Mixtures of polyisocyanates can be used and also polyisocyanates which have been modified by the introduction of urethane, allophanate, urea, biuret, carbodiimide, uretonimine, urethdione or isocyanurate residues.

Preferably the polyurethane (A) comprises 10 to 60 wt % and more preferably 20 to 50 wt % of component (i).

Preferably component (i) comprises organic polyisocyanates with a functionality of 2 (i.e. diisocyanates), however the polyurethane prepolymer may also be formed from additional component (ia) comprising 0 to 20 wt % of at least one organic polyisocyanate with an isocyanate functionality ≥2.2, more preferably in the range of from 2.5 to 4.0.

Preferably the polyurethane (A) comprises 3 to 15 wt %, more preferably 4 to 10 wt % of component (ia).

The effect of component (ia) is to allow a degree of pre-crosslinking in the prepolymer, however too much pre-crosslinking may result in an unacceptable increase in viscosity.

Component (ii) comprises any suitable polyol, preferably diol, containing ionic or potentially ionic water-dispersing groups.

Preferred ionic water-dispersing groups are anionic water-dispersing groups. Preferred anionic water-dispersing groups are carboxylic, phosphoric and/or sulphonic acid groups. Examples of such compounds include carboxyl containing diols and triols, for example dihydroxy alkanoic acids such as 2,2-dimethylol propionic acid (DMPA) or 2,2-dimethylolbutanoic acid (DMBA). Alternatively sulfonate groups may be used as potentially anionic water-dispersing groups. The anionic water-dispersing groups are preferably fully or partially in the form of a salt. Conversion to the salt form is optionally effected by neutralisation of the polyurethane (A) with a base, preferably during the preparation of the polyurethane (A) and/or during the preparation of the aqueous composition of the present invention.

If the anionic water-dispersing groups are neutralised, the base used to neutralise the groups is preferably ammonia, an amine or an inorganic base. Suitable amines include tertiary amines, for example triethylamine or N,N-dimethylethanolamine. Suitable inorganic bases include alkali hydroxides and carbonates, for example lithium hydroxide, sodium hydroxide, or potassium hydroxide. A quaternary ammonium hydroxide, for example $N^+(CH_3)_4(OH)$, can also be used. Generally a base is used which gives counter ions that may be desired for the composition. For example, preferred counter ions include $Li^+$, $Na^+$, $K^+$, $NH_4^+$ and substituted ammonium salts.

Cationic water dispersible groups can also be used, but are less preferred. Examples include pyridine groups, imidazole groups and/or quaternary ammonium groups which may be neutralised or permanently ionised (for example with dimethylsulphate).

Preferably the polyurethane (A) comprises 0.5 to 4.0 wt % and more preferably 1.0 to 3.0 wt % of component (ii).

Preferably polyurethane (A) comprises 0.5 to 3.0 wt % of neutralised component (ii).

The acid value of the polyurethane (A) may vary considerably depending on the hydrophobicity of the polyurethane and the degree, if any, of pre-crosslinking.

The polyurethane (A) preferably has an acid value in the range of from 0.5 to 25 mg KOH/g, more preferably in the range of from 2.0 to 17 mg KOH/g and most preferably in the range of from 4 to 12.5 mg KOH/g.

Component (iii) may contain ionic water-dispersing groups as discussed above and/or may also contain non-ionic water-dispersing groups. Preferably component (iii) contains anionic and/or non-ionic water-dispersing groups.

Preferred non-ionic water-dispersing groups are polyalkylene oxide groups, more preferably polyethylene oxide groups. A small segment of the polyethylene oxide group can be replaced by propylene segments and/or butylene oxide segments, however the polyethylene oxide group should still contain ethylene oxide as a major component. When the water-dispersible group is polyethylene oxide, preferably the polyethylene oxide group has a molecular weight from 175 to 5000 g/mol, more preferably from 350 to 2200 g/mol and most preferably from 660 to 2200 g/mol.

Examples of such compounds containing non-ionic water-dispersing groups include methoxy polyethylene glycol (MPEG) with molecular weights of for example 550, 750, 1000 and 2000 g/mol. Examples of such compounds containing ionic water-dispersing groups include polyether, polyester and polycarbonate polyols containing carboxylic acid groups.

Preferably the polyurethane (A) comprises 1 to 25 wt % and more preferably 2 to 10 wt % of component (iii). This is especially preferred when levels of component (ii) are kept to the minimum.

The polyurethane (A) preferably contains a sufficient concentration of ionic and/or non-ionic water-dispersing groups via components (ii) and (iii) capable of rendering the polyurethane self-water-dispersible (i.e. dispersible in water without the requirement to use added dispersing agents) but the concentration of such groups is preferably not so great that the polyurethane has an unacceptably high water solubility in order to not compromise the water sensitivity of the final coating.

Moreover, the strength of the ionic and/or non-ionic water-dispersing groups or their efficiency as a dispersing and/or stabilising group may also influence the optimal amounts required.

Component (iv) carries ethylenically unsaturated bond functionality capable of crosslinking which is susceptible to initiation by radiation. It is especially preferred that this radiation is UV radiation. Radiation initiated crosslinking may be carried out with or without added photoinitiator.

Component (iv) may consist of partly (meth)acrylolyl functional hydroxyl functional polyesters and epoxy(methacrylates) and hydroxylalkyl(meth)acrylates.

Multifunctional (meth)acrylate monomers are for example (meth)acrylic acid esters of mono-, di- and trihydroxyl alcohols (e.g. polyethylene glycol, polypropylene glycol, aliphatic diols, ethylene glycol, neopentyl glycol, ethoxylated bisphenol A, trimethylolpropane, pentaerythritol, glycerol, di-trimethylolpropane, dipentaerythritol, corresponding hydroxyl functional polyesters prepared from the mentioned alcohols with di- and triacids and its corresponding anhydrides like for example succinic acid, adipic acid, (iso)phtalic acid, terephthalic acid, cyclohexanedicarboxylic acid, and the ethoxylated, propoxylated and polycaprolactone analogues of all of the above.

Epoxy(meth)acrylates are products formed by the reaction of (meth)acrylic acid with an epoxy(glycidyl) functional component e.g. aliphatic and aromatic containing epoxy resins, epoxidised oils, acrylic polymers and acrylic grafted polymers in which the acrylic component contains pendent epoxy groups. Some of the (meth)acrylic acid may be replaced by other acids, both ethylenically unsaturated and saturated, so as to impart specific properties e.g. aliphatic acids, fatty acids and aromatic acids. These products may alternatively be prepared by the reaction of a carboxylic acid functional component (e.g. polyesters and acrylic polymers) with a second component containing both epoxy groups and ethylenic unsaturation e.g. glycidyl(meth)acrylate.

Hydroxyl alkyl(methacrylates) are for example; 2-hydroxy ethyl(meth)acrylate, hydroxyl propyl(meth)acrylate, hydroxyl butyl(meth)acrylate or its higher homologues and the ethoxylated, propoxylated and polycaprolactone analogues of the above.

The polyurethane (A) preferably comprises 0 to 80 wt %, more preferably 0 to 60 wt % and most preferably 5 to 40 wt % of component (iv).

Polyurethane (A) may contain a component (v) which may provide other crosslinking functional groups which for example allow (self-)crosslinking.

Component (v) may also comprise polyols containing neither ionic or non-ionic water-dispersing groups.

The polyols particularly include diols and triols and mixtures thereof but higher functionality polyols may be used, for example as minor components in admixture with diols. The polyols may be members of any of the chemical classes of polyols used or proposed to be used in polyurethane formulations. In particular the polyols may be polyesters, polyesteramides, polyethers, polythioethers, polycarbonates, polyacetals, polyolefins or polysiloxanes. Preferred molecular weights are from 600 to 4000, more preferably from 700 to 3000 g/mol.

Component (v) may also comprise low molecular weight organic compounds containing at least one (preferably at least two) isocyanate-reactive groups and having a weight average molecular weight up to 500 g/mol, preferably in the range of 40 to 250 g/mol can also be used. For example component (v) may comprise a diol having a molecular weight of 40 to 500 g/mol. Examples include ethyleneglycol, di-ethylene glycol, tri-ethylene glycol, tetra-ethylene glycol and similarly poly-glycols made from propylene glycol up to a molecular weight of 500 g/mol, neopentyl glycol; 1-propanol, bis(hydroxyethyl)terapthalate, furan dimethanol, glycerol, 1,4-cyclohexyldimethanol and the reaction products of these examples with propylene and/or ethylene glycol up to a molecular weight of 500 g/mol.

Preferably the polyurethane (A) comprises 0 to 40 wt % and more preferably 0 to 30 wt % of component (v).

If a isocyanate-terminated prepolymer is formed first, it is conventionally formed by reacting a stoichiometric excess of the organic polyisocyanate with the isocyanate-reactive compounds under substantially anhydrous conditions at a temperature between about 30° C. and about 130° C. until reaction between the isocyanate groups and the isocyanate-reactive groups is substantially complete. The reactants for polyurethane (A) are generally used in proportions corresponding to a ratio of isocyanate groups to isocyanate-reactive groups of from about 0.5:1 to about 6:1, preferably from about 0.6:1 to 3:1.

If desired, catalysts such as dibutyltin dilaurate and stannous octoate, zirconium or titanium based catalysts may be used to assist the isocyanate-terminated prepolymer and/or polyurethane formation. An organic solvent may optionally be added before or after prepolymer formation or final polyurethane formation to control the viscosity. Examples of solvents include water-miscible solvents such as N-methylpyrrolidinone, dimethyl acetamide, glycol ethers such as butyldiglycol, methyl ethyl ketone and alkyl ethers of glycol acetates or mixtures thereof. The solvent may also include reactive diluents such as olefinically unsaturated monomers. Optionally no organic solvents are added.

The aqueous composition may be prepared by dispersing an isocyanate-terminated polyurethane prepolymer (optionally carried in an organic solvent medium) in an aqueous medium and chain extending the prepolymer with at least one active hydrogen-containing chain extender in the aqueous phase.

Active hydrogen-containing chain extenders (component (vi)) which may be reacted with an isocyanate-terminated polyurethane prepolymer include amino-alcohols, primary or secondary diamines or polyamines, hydrazine, and substituted hydrazines.

Examples of such chain extenders useful herein include alkylene diamines such as ethylene diamine and cyclic amines such as isophorone diamine. Also materials such as hydrazine, substituted hydrazines such as, for example, dimethyl hydrazine, 1,6-hexamethylene-bis-hydrazine, carbodihydrazine, hydrazides of dicarboxylic acids and sulphonic acids such as adipic acid mono- or dihydrazide, oxalic acid dihydrazide, isophthalic acid dihydrazide, hydrazides made by reacting lactones with hydrazide such as gammahydroxylbutyric hydrazide, bis-semi-carbazide, and bis-hydrazide carbonic esters of glycols may be useful. Water itself may be effective as an indirect chain extender. Preferably the active-hydrogen chain extending compound is selected from the group comprising water, amino-alcohols, primary or secondary diamines or polyamines, hydrazine, substituted hydrazines and substituted hydrazides.

Where the chain extender is other than water, for example, a polyamine or hydrazine, it may be added to the aqueous dispersion of the isocyanate-terminated polyurethane prepolymer or, alternatively, it may already be present in the aqueous medium when the isocyanate-terminated polyurethane prepolymer is dispersed therein. The isocyanate-terminated polyurethane prepolymer may also be chain extended to form the polyurethane while dissolved in organic solvent (usually acetone) followed by the addition of water to the solution until water becomes the continuous phase and the subsequent removal of the solvent by distillation to form an aqueous dispersion.

The chain extension may be conducted at convenient temperatures from about 5° C. to 95° C. or, more preferably, from about 10° C. to 60° C.

The total amount of active-hydrogen chain extending compound employed, if used, (apart from water) should be such that the ratio of active hydrogens in the chain extender to isocyanate groups in the polyurethane prepolymer preferably is in the range from 0.1:1 to 2.0:1 more preferably 0.80:1 to 1.7:1.

Surfactants and/or high shear can be utilised in any order to any assist in the dispersion of isocyanate-terminated prepolymer or the polyurethane (A) in water (even if it is self-dispersible). Suitable surfactants include but are not limited to conventional anionic, cationic and/or nonionic surfactants such as Na, K and $NH_4$ salts of dialkylsulphosuccinates, Na, K and $NH_4$ salts of sulphated oils, Na, K and $NH_4$ salts of alkyl sulphonic acids, Na, K and $NH_4$, alkyl sulphates, alkali metal salts of sulphonic acids; fatty alcohols, ethoxylated fatty acids and/or fatty amines, and Na, K and $NH_4$ salts of fatty acids such as Na stearate and Na oleate. Other anionic surfactants include alkyl or (alk)aryl groups linked to sulphonic acid groups, sulphuric acid half ester groups (linked in turn to polyglycol ether groups), phosphonic acid groups, phosphoric acid analogues and phosphates or carboxylic acid groups. Cationic surfactants include alkyl or (alk)aryl groups linked to quaternary ammonium salt groups. Non-ionic surfactants include polyglycol ether compounds and polyethylene oxide compounds. The amount of surfactant used is preferably 0 to 15% by weight, more preferably 0 to 8% by weight, still more preferably 0 to 5% by weight, especially 0.1 to 3% by weight, and most especially 0.3 to 2% by weight based on the weight of the polyurethane (A).

Radiation curable component (B) carries ethylenically unsaturated bond functionality capable of crosslinking which is susceptible to initiation by radiation. It is especially preferred that this radiation is UV radiation. Radiation initiated crosslinking may be carried out with or without added photoinitiator. Preferably radiation curable component (B) carries one, preferably two or more radiation polymerisable ethylenically unsaturated bonds which are capable of crosslinking.

A wide variety of radiation curable component (B) may be employed. Typical examples include but are not limited to epoxy(meth)acrylates; urethane(meth)acrylates; multi-functional (meth)acrylate monomers; UV-curable urethane dispersions and amine-(meth)acrylate adducts.

Epoxy(meth)acrylates are products formed by the reaction of (meth)acrylic acid with an epoxy(glycidyl) functional component e.g. aliphatic and aromatic containing epoxy resins, epoxidised oils, acrylic polymers and acrylic grafted polymers in which the acrylic component contains pendent epoxy groups. Some of the (meth)acrylic acid may be replaced by other acids, both ethylenically unsaturated and saturated, so as to impart specific properties e.g. aliphatic acids, fatty acids and aromatic acids. These products may alternatively be prepared by the reaction of a carboxylic acid functional component (e.g. polyesters and acrylic polymers) with a second component containing both epoxy groups and ethylenic unsaturation e.g. glycidyl(meth)acrylate.

Urethane(meth)acrylates are those products formed by the reaction of an isocyanate containing component with a hydroxyl containing component. At least one of these components must contain ethylenic unsaturation. Examples of isocyanate functional components are hexamethylene diisocyanate, isophorone diisocyanate, isocyanate functional acrylic polymers and polyurethanes, reaction products of hydroxyl functional components (e.g. polyethylene glycol, polypropylene glycol and di-, tri- and etc-hydroxy aliphatic alcohols (e.g. glycerol and trimethylolpropane) and their ethoxylated, propoxylated and polycaprolactone analogs) with di-, tri- and etc-isocyanates (e.g. hexamethylene diisocyanate, isophorone diisocyanate and toluene diisocyanate). Examples of hydroxy containing ethylenically unsaturated components are hydroxyethyl(meth)acrylate and its ethoxylated, propoxylated and polycaprolactone analogs as well as (meth)acrylated polyester polyols and (meth)acrylated polyether polyols.

Preferred urethane(meth)acrylates have a number average molecular weight in the average range of from 300 to 60,000, more preferably 400 to 25,000 g/mol and most preferably 500 to 15,000 g/mol as determined by Gel Permeation Chromatography using polystyrene as a standard and tetrahydrofuran as an eluent.

Multifunctional (meth)acrylate monomers are for example (meth)acrylic acid esters of di- and tri-hydroxyl alcohols (e.g. polyethylene glycol, polypropylene glycol, aliphatic diols, neopentyl glycol, ethoxylated bisphenol A, trimethylolpropane, pentaerythritol, glycerol, di-trimethylolpropane, hydroxyl functional polyesters, dipentaerythritol and the ethoxylated, propoxylated and polycaprolactone analogues of all the above.

Amine-(meth)acrylate adducts are those products prepared by the partial "Michael Type Addition" of primary and secondary amines to ethylenic unsaturation i.e. the double bond of (meth)acrylate containing compounds. Of particular interest here are the multi-functional (meth)acrylate monomers as mentioned above. Examples of amine-acrylate adducts are diethylamine modified trimethylolpropane triacrylate and ethanolamine modified ethoxylated trimethylolpropane triacrylate.

All of the above listed examples of radiation curable component (B) may incorporate specific hydrophilic components to facilitate their being dissolved, emulsified or dispersed in the aqueous composition of the invention. Examples are secondary amines, phosphoric acid, hydroxyl alkanoic acids and anhydrides (e.g. succinic anhydride, phthalic anhydride and tetrahydrophthalic anhydride). The resulting tertiary amines and pendent carboxylic acid groups are then neutralised. Another hydrophilic group of particular interest is ethylene and/or polyethylene oxide groups. The total amount of ethylene oxide present in the multifunctional material is preferably <80 wt %, more preferably <50 wt % and most preferably <35 wt % based on the molecular weight of radiation curable component (B).

Preferably radiation curable component (B) is substituted and unsubstituted (meth)acrylates. Preferred examples are the esters of (meth)acrylic acid with monohydric and polyhydric compounds such as ethyl, butyl, hexyl, octyl, and decyl(meth)acrylates; neopentyl glycol di(meth)acrylate, trimethylolpropane tri(meth)acrylate (TMPTA), pentaerythritol tri(meth)acrylate and tetra(meth)acrylate, caprolactone (meth)acrylates, alkoxylated(meth)acrylates, glycerol(meth)acrylates, 1,4-butanediol di(meth)acrylate, 1,6-hexane diol di(meth)acrylate, 2,2-dimethyl-3-hydroxypropyl-2,2-dimethyl-3-hydroxypropionate di(meth)acrylate, isobornyl (meth)acrylate, tripropylene glycol di(meth)acrylate, urethane(meth)acrylates, (meth)acrylated epoxides and the like. Especially suitable are (meth)acrylates such as TMPTA, pentaerythritol acrylate (PETA), 1,5-hexane diol diacrylate (HDDA) and neopentyl glycol diacrylate (NPGDA) which have a hydrophobic character.

If radiation curable component (B) is a reactive diluent comprising low molecular weight (preferably less than 1000 g/mol), components (B1) such as multifunctional acrylates, expoyacrylates and acrylated urethanes then the composition of the invention preferably comprises from 1 to 30 wt %, more preferably from 2 to 20 wt % and most preferably from 3 to 15 wt % of radiation curable component (B1) based on the weight of (A)+(B1)+(C).

If radiation curable component (B) is a high molecular weight (preferably greater than 1000 g/mol), components (B2) such as UV curable polyurethane dispersions (for example NeoRad R440, available from DSM NeoResins BV) then the composition of the invention preferably comprises from 10 to 90 wt %, more preferably from 25 to 90 wt % and most preferably from 60 to 85 wt % of radiation curable component (B2) based on the weight of (A)+(B2)+(C).

A range of thickeners are available for aqueous coating compositions including associative thickeners.

Associative thickeners herein improve storage stability by increasing the viscosity of the composition. Examples of associative thickeners include water soluble polymers, in particular hydrophobic modified water soluble polymers such as hydrophobically modified ethylene oxide urethane block copolymers (HEUR) which provides stabilisation and modifies the rheology by acting as a thickener and hydrophobically modified alkali soluble emulsions (HASE).

HEUR's tend to be mainly non-ionic and HASE's tend to be anionic in nature. Preferably a hydrophobically modified ethylene oxide urethane block copolymer is used with a sequence of at least 5 ethylene oxide groups, preferably 10, most preferably 20.

Coatings and rheology properties are reviewed in Organic Coatings, Science and Technology, Vol 2, Chapter 19 and 35, Z. W Wicks, F. N. Jones, S. P Pappas, John Wiley & Sons ISBN 0-471-59893-3(v 2).

The composition of the invention preferably comprises from 0.5 to 8 wt % and more preferably from 1.0 to 5 wt % of associative thickener (C) based on the weight of (A)+(B)+(C).

In a further embodiment of the present invention if a reactive diluent is employed, in particular where the reactive diluent comprises olefinically unsaturated monomers (also known as vinyl monomers) these may be polymerised in-situ to prepare a vinyl polymer.

Suitable vinyl monomers include but are not limited to (meth)acrylic acid, fumaric acid, itaconic acid, 1,3-butadiene, isoprene, styrene, a-methyl styrene, divinyl benzene, indene, acrylonitrile, methacrylonitrile, vinyl halides such as vinyl chloride, vinyl esters such as vinyl acetate, vinylpropionate, vinyl laurate, vinyl esters of versatic acid, heterocyclic vinyl compounds, alkyl esters of mono-olefinically unsaturated dicarboxylic acids (such as di-n-butyl maleate and di-n-butyl fumarate) and, in particular, esters of (meth)acrylic acid of formula $CH_2=CR^1-COOR^2$ wherein $R^1$ is H or methyl and $R^2$ is optionally substituted alkyl or cycloalkyl of 1 to 20 carbon atoms (more preferably 1 to 8 carbon atoms) examples of which are methyl(meth)acrylate, ethyl(meth)acrylate, trifluorethyl(meth)acrylate, n-butyl (meth)acrylate, 2-ethylhexyl(meth)acrylate, isopropyl (meth)acrylate, n-propyl(meth)acrylate, and hydroxyalkyl (meth)acrylates such as 2-hydroxyethyl(meth)acrylate, 2-hydroxypropyl(meth)acrylate and 4-hydroxybutyl(meth) acrylate.

Preferably the reactive diluent comprises vinyl monomers selected from at least one member of the group containing free vinyl acids, esters of (meth)acrylic acid, hydroxy alkyl (meth)acrylates and styrene.

All of the vinyl monomers may be present at the commencement of the preparation of the isocyanate-terminated prepolymer or some or all of the vinyl monomers may be added during the course of the preparation.

Preferably the vinyl monomers are not polymerised until after any optional chain extension has been carried out.

The polymerisation of any vinyl monomer will require the use of a free-radical-yielding initiator to initiate the vinyl polymerisation. Suitable free-radical-yielding initiators include inorganic peroxides such as ammonium persulphate hydrogen peroxide, organic peroxides, such as benzoyl peroxide, alkyl hydroperoxides such as t-butyl hydroperoxide and cumene hydroperoxide; dialkyl peroxides such as di-t-butyl peroxide; peroxy esters such as t-butyl perbenzoate and the like; mixtures may also be used. The peroxy compounds are in some cases advantageously used in combination with suitable reducing agents (redox systems) such as iso-ascorbic acid. Azo compounds such as azobisisobutyronitrile may also be used. Metal compounds such as Fe.EDTA (EDTA is ethylene diamine tetracetic acid) may also be usefully employed as part of the redox initiator system. The amount of initiator or initiator system to use is conventional, e.g. within the range of 0.05 to 6 wt % based on the weight of vinyl monomer used.

Such an aqueous vinyl polymerisation normally would need to be performed in the presence of an external stabilising and/or dispersing material such as the surfactants discussed above and the amount used is usually 0.1 to 5% by weight based on the total vinyl monomer used.

The theoretical glass transition temperature, calculated using the Fox equation, of the resultant vinyl polymer may vary within a wide range, a preferred range being from −50 to 120° C., preferably from −20 to 80° C.

After polymerisation, the free vinyl monomer content in the aqueous composition of the invention is preferably less than 500 ppm, more preferably less than 300 ppm and more preferably less than 100 ppm.

If a reactive diluent comprising vinyl monomers is used, the ratio of resultant vinyl polymer to polyurethane (A) is preferably in a weight ratio in the range of from 10:90 to 90:10, more preferably 10:90 to 60:40 and most preferably 15:85 to 50:50.

In another embodiment of the present invention there is provided a process for preparing the aqueous coating composition comprising the following steps:
a) reaction of components (i) to (vi) to form an polyurethane (A);
b) forming an aqueous dispersion of the polyurethane (A) in water;
c) optionally neutralising the polyurethane (A);
d) adding at least a radiation curable component (B);
e) adding at least an associative thickener;
f) optionally adding a radiation initiator;
g) optionally adding vinyl monomer;
where steps b), c), d), e), f) and g) may be in any order.

The aqueous composition of the present invention typically has a solids content of from about 20 to 60% by weight, more preferably from 25 to 55% by weight.

The aqueous composition of the present invention may contain other conventional ingredients including coalescing organic solvents, pigments, dyes, emulsifiers, surfactants, thickeners, heat stabilisers, levelling agents, anti-cratering agents, fillers, sedimentation inhibitors, UV absorbers, antioxidants and the like introduced at any stage of the preparation process or subsequently. It is possible for example to include an amount of antimony oxide in the dispersions to enhance the fire retardant properties.

Typically a flattening agent when added at 5% by weight of the polyurethane (A) reduces the gloss at 80° by ≥30%. Preferably the aqueous composition of the invention contains <5% by weight of flattening agent, more preferably ≤4.5%, most preferably ≤4%, especially ≤2%, more especially ≤1% and most especially contains in the range of from 0 to 0.5 wt % of flattening agent by weight of polyurethane (A).

The aqueous coating composition of the present invention is particularly useful as a coating composition or for providing the principle component of coating compositions (e.g. protective or decorative coating compositions) for which purpose they may be further diluted with water and/or organic solvents, or they may be supplied in more concentrated form by evaporation of water and/or organic components of the liquid medium. As coating compositions, they may be applied to a variety of substrates including wood, board, metal, stone, concrete, glass, cloth, leather, paper, plastics, foam and the like, by conventional methods including brushing, dipping, flow coating, spraying, and the like. They are, however, particularly useful for providing coatings on wood and board substrates. The aqueous liquid medium usually comprising water and any co-solvent is removed by natural or accelerated (by heat) drying to form a coating.

There is further provided according to the present invention a coating obtained from an aqueous composition according to the present invention.

There is also provided a coated substrate having a coating comprising an aqueous coating composition according to the present invention; and a method for coating a substrate using an aqueous coating composition according to the present invention comprising a) application of the aqueous coating composition to the substrate and b) removal of the water and any co-solvent.

The present invention is now illustrated by reference to the following example. Unless otherwise specified, all parts, percentages and ratios are on a weight basis.

Materials Used:

NeoRez R1000=aliphatic polyurethane dispersion,
    Acid value in the range of from 4 to 12 mgKOH/g
    Contains 1 to 5 wt % of associative thickener
    Mw in the range of from 5000 to 25000 g/mol
    Viscosity 195 mPa·s, 32% solids
    available from DSM NeoResins BV NeoRad R440=UV curable aliphatic polyurethane dispersion,
    Viscosity 120 mPa·s, 40% solids
    available from DSM NeoResins BV ethoxylated TMPTA=UV radiation curable trimethylolpropane ethoxy triacrylate containing 3 ethoxy groups, Mw 428 g/mol IPDI=isophoronediisocyanate DMPA=dimethylol proprionic acid DC1248 fluid=polyhydroxyl polydimethylsiloxane polyol ex Dow Corning polyTHF 2000=polytetrahydrofuran Mw 2000 g/mol Desmodur N3200=biuret of hexanediisocyanate from Bayer TEA=triethylamine Nopco DSX 1514=Associative thickener ex Henkel Disponil AFX 3070=Surfactant ex Cognis Tegofoamex 805=Defoamer ex Tego

EXAMPLES

The following examples were prepared and coatings were obtained and tested. The compositions of the examples and results are as shown in the tables below.

UV Curing:

Examples that were UV cured were cured in the following way:

Coating layer thickness: 120 μm wet on Leneta

UV curing: 400 mJ/cm$^3$, 240 nm/80 Watt after 2 minutes flash off at 120° C.

Photoinitiator: 3 wt % Esacure KIP100F/IPA (2:5) on total composition

Gloss Measurements

BYK Gardner micro-TRI-gloss 20-60-85 glossmeter in accordance with ASTM D523-89.

König Hardness

König Hardness as used herein is a standard measure of hardness, being a determination of how the viscoelastic properties of a film formed from the dispersion slows down a swinging motion deforming the surface of the film and is measured according to DIN 53157 using an Erichsen hardness tester.

Chemical Resistances:

Drops of the various testing liquids (water, 50% ethanol in water, coffee and "Cif" a commonly used Dutch detergent) were placed on the films and covered with a watch glass. The liquids were removed after 1 hour at room temperature and the damage to the coating was assessed immediately and after four hours recovery. 0 means that the coating is dissolved, 5 means that the coating is not affected at all.

Resistance to MEK or Ethanol

MEK (methyl ethyl ketone) or ethanol rub tests (being a measure of the resistance of the coating to the solvent) were performed on the coated glass plates using cotton wool soaked with the solvent which was rubbed over the surface of the coating, the number of rubs before failure being listed.

The results of the tests are shown in Tables 2, 3, 5, 6, 8 and 9 below.

Examples 1, 2

UV Curable Dispersion

And Comparative Example 1

TABLE 1

| | NeoRez R-1000 (grams) | ethoxylated TMPTA (grams) | NeoRad R-440 (grams) | UV-cured | C=C mol/g |
|---|---|---|---|---|---|
| Comparative Example 1 | 100 | 0 | 0 | No | 0 |
| Example 1 | 90.9 | 9.1 | 0 | Yes | 0.64 |
| Example 2 | 55.6 | 0 | 44.4 | Yes | 0.58 |

TABLE 2

| | Gloss | | KH | MEK |
|---|---|---|---|---|
| | 60° | 85° | (s) | rubs |
| Comparative Example 1 | 1.4 | 51.1 | 49 | 10 |
| Example 1 | 4.4 | 36.7 | 42 | 81 |
| Example 2 | 0.6 | 22.6 | 70 | 100 |

TABLE 3

| | Stain resistances | | | | | |
|---|---|---|---|---|---|---|
| | Water | Ethanol/water | Cif | Coffee | Tea | Total |
| Comparative Example 1 | 4 | 2 | 4 | 2 | 2 | 14 |
| Example 1 | 5 | 4 | 4 | 2 | 3 | 18 |
| Example 2 | 4 | 4 | 4 | 3 | 4 | 19 |

Comparative Example 3 and Example 4

UV Curable Dispersion

A 2000 cm$^3$ flask equipped with a thermometer and overhead stirrer was charged with IPDI (110.78 g) 9.0, DMPA (9.0 g), DC1248 (27.0 g), polyTHF 2000 (351.0 g), 2,6-di-tert-butyl-4-methyl phenol (0.23 g), ethoxylated TMPTA (48.0 g) and 0.1 tin octoate (0.1 g) and slowly heated to 85° C. and kept at this temperature for 2 hours. Subsequently Desmodur N3200 (54.0 g) was added and the measured NCO % of the resultant isocyanate terminated prepolymer was 5.39%.

A dispersion of the resultant isocyanate-terminated prepolymer was made by feeding this prepolymer (424.25 g), neutralised with TEA (4.8 g), to water (862.5 g) containing Nopco DSX 1514 (33.9 g), Disponil AFX 3070 (9.1 g), Tegofoamex 805 (4.2 g). After the prepolymer was fed to the water phase hydrazine (49.35 g, 15.2 wt %) was added.

The final solids content of the resulting UV curable polyurethane dispersion (comparative example 3) was 32%, the Brookfield viscosity was 412 mPa·s, the acid value was 6 mg KOH/g and the pH was 7.3.

Example 4

Example 4 was prepared by adding NeoRad R-440 to the dispersion of comparative example 3 (see table 4 below). Example 4 was UV cured at 120 μm wet films, flash off time 10 minutes at 60° C.

TABLE 4

| | Example 3 (grams) | NeoRad R-440 (grams) | UV-cured | C=C mol/g |
|---|---|---|---|---|
| Comparative Example 3 | 100 | 0 | No | 0.18 |
| Example 4 | 80 | 20 | Yes | 0.25 |

TABLE 5

| | Gloss | | KH | MEK | Ethanol |
|---|---|---|---|---|---|
| | 60° | 85° | (s) | rubs | Rubs |
| Comparative Example 3 | 0.8 | 12.8 | 31 | 7 | 7 |
| Example 4 | 3 | 7.8 | 45 | 101 | 131 |

TABLE 6

| | Stain resistances | | | | | |
|---|---|---|---|---|---|---|
| | Water | Ethanol/water | Cif | Coffee | Tea | Total |
| Comparative Example 3 | 3 | 0 | 3 | 2 | 2 | 10 |
| Example 4 | 3 | 4 | 4 | 3 | 4 | 18 |

Example 5

UV Curable Polyurethane Dispersion

A 2000 cm³ flask equipped with a thermometer and overhead stirrer was charged with IPDI (124.4 g), DMPA (9.0 g), DC1248 (27.0 g), polyTHF 2000 (312.7 g), Bisphenol A diepoxy diacrylate (24.9 g), ethoxylated TMPTA (48.1 g) and Tin octoate (0.1 g) and slowly heated to 85° C. and kept at this temperature for 2 hours. Subsequently Desmodur N3200 (54.0 g) was added and the measured NCO % of the resultant isocyanate terminated prepolymer was 5.70%.

A dispersion of the resultant isocyanate-terminated prepolymer was made by feeding the prepolymer (424.25 g), neutralised with TEA (3.85 g), to water (863.4 g) containing Nopco DSX 1514 (33.9 g), Disponil AFX 3070 (9.1 g) and Tegofoamex 805 (4.2 g). After the prepolymer was fed to the water phase hydrazine (51.52 g, 15.2 wt %) was added.

The final solids content of the resulting UV curable polyurethane dispersion was 32%, the Brookfield viscosity was 457 mPa·s, the acid value was 6 mg KOH/g, and pH was 7.1.

Example 5

Example 5 was prepared by adding NeoRad R-440 to the dispersion (see table 7 below)

TABLE 7

|  | Example 5 (grams) | NeoRad R-440 (grams) | UV-cured | C=C mol/g |
|---|---|---|---|---|
| Example 5 | 70 | 30 | Yes | 0.32 |

TABLE 8

|  | Gloss | | KH | MEK | Ethanol |
|---|---|---|---|---|---|
|  | 60° | 85° | (s) | rubs | Rubs |
| Example 5 | 0.6 | 1.4 | 46 | 200 | 93 |

TABLE 9

|  | Stain resistances | | | | | |
|---|---|---|---|---|---|---|
|  | Water | Ethanol/water | Cif | Coffee | Tea | Total |
| Example 5 | 3 | 4 | 4 | 3 | 4 | 18 |

Particle Size Measurements

A Mastersizer 2000 from Malvern, which measures the particle size and particle size distribution by laser diffraction, was used to measure the particle size of the whole composition, i.e. (A)+(B)+(C) and the results are shown in Table 10 below.

The technique of laser diffraction is based on the principle that particles passing through a laser beam will scatter light at an angle that is directly related to their size. The observed scattering intensity is also dependent on particle sizes. Large particles scatter light at narrow angles with high intensity, whereas small particles scatter light at wider angles but with low intensity.

TABLE 10

|  | Particle size X (μm) | | |
|---|---|---|---|
|  | D(0.1) | D(0.5) | D(0.9) |
| Comparative Example 1 | 1.605 | 3.122 | 7.671 |
| Example 1 | 1.633 | 3.094 | 6.621 |
| Example 2 | 1.541 | 2.954 | 6.642 |
| Example 4 | 1.304 | 9.108 | 19.094 |
| Example 5 | 1.598 | 9.553 | 22.215 |

D(0.1) = first 10% of the particle size distribution has a mean particle size < X
D(0.5) = first 50% of the particle size distribution has a mean particle size < X
D(0.9) = first 90% of the particle size distribution has a mean particle size < X

The invention claimed is:

1. An ultraviolet (UV) radiation curable aqueous coating composition comprising:
   (A) 10 to 99 wt % of a polyurethane obtained by the reaction of components comprising:
   (i) 5 to 65 wt % of at least one organic polyisocyanate;
   (ii) 0.1 to 6 wt % of at least one polyol containing ionic or potentially ionic water-dispersing groups having a molecular weight in the range of from 100 up to 500 g/mol;
   (iii) 0 to 30 wt % of at least one isocyanate-reactive component containing water-dispersing groups and having a molecular weight in the range of from 500 to 6000 g/mol;
   (iv) 0 to 80 wt % of at least one isocyanate-reactive component containing radiation curable functional groups and having a molecular weight in the range of from 70 to 6000 g/mol;
   (v) 0 to 50 wt % of at least one component not comprised by (i), (ii), (iii), (iv) or (vi);
   (vi) 0 to 50 wt % of at least one active-hydrogen chain extending compound;
   where (i), (ii), (iii), (iv), (v) and (vi) add up to 100 wt %; and
   where the NCO:OH ratio is in the range of from 0.4:1.0 to 10.0:1.0;
   (B) 1 to 90 wt % of a radiation curable component carrying two or more radiation polymerizable ethylenically unsaturated bonds which are capable of crosslinking; and
   (C) 0.1 to 10 wt % of an associative thickener; wherein (A)+(B)+(C) add up to 100 wt %; and wherein
   at least 80 wt % of the polyurethane (A)+(B)+(C) has a particle size greater than 500 nm; and wherein the C=C bond concentration of the composition is 0.2 to 5.0 mmol per g of (A)+(B)+(C) and wherein
   crosslinking of the aqueous coating composition is initiated by UV radiation, and wherein
   the coating composition exhibits an 85° gloss of <60 upon curing in the absence of a flattening agent.

2. The UV radiation curable aqueous coating composition according to claim 1, which comprises <5% by weight of flattening agent by weight of the polyurethane (A).

3. The UV radiation curable aqueous coating composition according to claim 1, wherein the 60° gloss of the aqueous coating composition upon curing is <40.

4. The UV radiation curable aqueous coating composition according to claim 1, wherein at least 85 wt % of (A)+(B)+(C) has a particle size greater than 500 nm and less than 25000 nm.

5. The UV radiation curable aqueous coating composition according to claim 1, wherein the mean particle size (D[0.1]) of (A)+(B)+(C) is greater than 500 nm and less than 90000 nm.

6. The UV radiation curable aqueous coating composition according to claim 1, wherein polyurethane (A) comprises 0.5 to 3.0 wt % of neutralised component (ii).

7. The UV radiation curable aqueous coating composition according to claim 1, wherein radiation curable component (B) is selected from the group consisting of epoxy (meth) acrylates; urethane (meth)acrylates; multi-functional (meth) acrylate monomers; UV-curable urethane dispersions, amine-(meth)acrylate adducts and mixtures thereof.

8. The UV radiation curable aqueous coating composition according claim 1, wherein the radiation curable component (B) comprises a low molecular weight radiation curable component (B1) in an amount of 1 to 30 wt %, based on the weight of components (A), (B1) and (C).

9. The UV radiation curable aqueous coating composition according to claim 1, wherein the radiation curable component (B) comprises a high molecular weight radiation curable component (B2) in an amount of 10 to 90 wt %, based on the weight of components (A), (B2) and (C).

10. The UV radiation curable aqueous coating composition according to claim 1, wherein the associative thickeners component (C) is selected from the group consisting of hydrophobic modified water soluble polymers, hydrophobically modified alkali soluble emulsions and mixtures thereof.

11. The UV radiation curable aqueous coating composition according to claim 1 additionally comprising a vinyl polymer.

12. The UV radiation curable aqueous coating composition according to claim 11, wherein the ratio of the vinyl polymer to polyurethane (A) is in the range of from 10:90 to 90:10.

13. A process for preparing the aqueous coating composition according to claim 1 comprising the following steps:
  a) reacting components (i) to (vi) to form an polyurethane (A);
  b) forming an aqueous dispersion of the polyurethane (A) in water;
  c) optionally neutralising the polyurethane (A);
  d) adding at least a radiation curable component (B);
  e) adding at least an associative thickener;
  f) optionally adding a radiation initiator;
  g) optionally adding vinyl monomer;
  wherein steps b), c), d), e), f) and g) may be in any order.

14. A coated substrate comprising a substrate and a cured coating on the substrate of a UV-cured coating composition having an 85° gloss of <60 in the absence of a flattening agent, wherein the cured coating is a UV-cured reaction product of an aqueous coating composition comprising:
  (A) 10 to 99 wt % of a polyurethane obtained by the reaction of components comprising:
    (i) 5 to 65 wt % of at least one organic polyisocyanate;
    (ii) 0.1 to 6 wt % of at least one polyol containing ionic or potentially ionic water-dispersing groups having a molecular weight in the range of from 100 up to 500 g/mol;
    (iii) 0 to 30 wt % of at least one isocyanate-reactive component containing water-dispersing groups and having a molecular weight in the range of from 500 to 6000 g/mol;
    (iv) 0 to 80 wt % of at least one isocyanate-reactive component containing radiation curable functional groups and having a molecular weight in the range of from 70 to 6000 g/mol;
    (v) 0 to 50 wt % of at least one component not comprised by (i), (ii), (iii), (iv) or (vi);
    (vi) 0 to 50 wt % of at least one active-hydrogen chain extending compound;
    where (i), (ii), (iii), (iv), (v) and (vi) add up to 100 wt %; and
    where the NCO:OH ratio is in the range of from 0.4:1.0 to 10.0:1.0;
  (B) 1 to 90 wt % of a radiation curable component carrying two or more radiation polymerizable ethylenically unsaturated bonds which are capable of crosslinking; and
  (C) 0.1 to 10 wt % of an associative thickener; wherein (A)+(B)+(C) add up to 100 wt %; and wherein
  at least 80 wt % of the polyurethane (A)+(B)+(C) has a particle size greater than 500 nm; and wherein the C=C bond concentration of the composition is 0.2 to 5.0 mmol per g of (A)+(B)+(C).

15. The coated substrate as in claim 14, wherein the cured composition has a 60° gloss of <40.

16. A method of forming a coated substrate comprising coating the UV radiation curable aqueous coating composition according to claim 1 onto a substrate, and thereafter subjecting the coating on the substrate to UV radiation to cure the coating composition.

* * * * *